Dec. 27, 1938.　　　S. A. McKITTRICK　　　2,141,359
LAWN MOWER SHARPENER
Filed Oct. 18, 1937
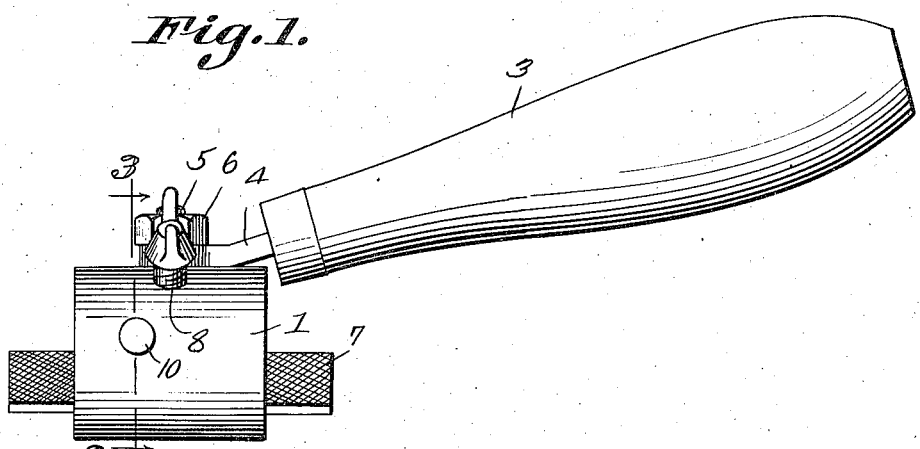
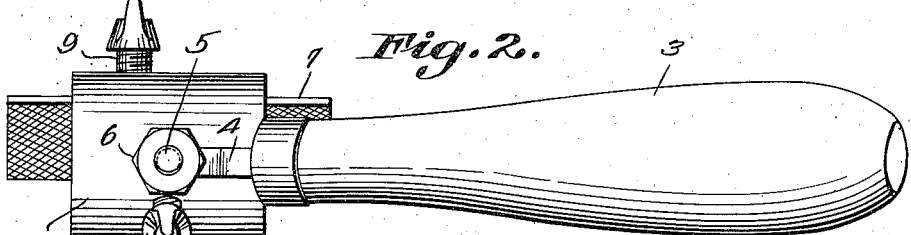
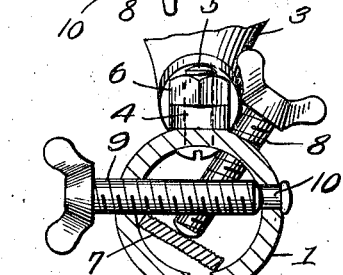
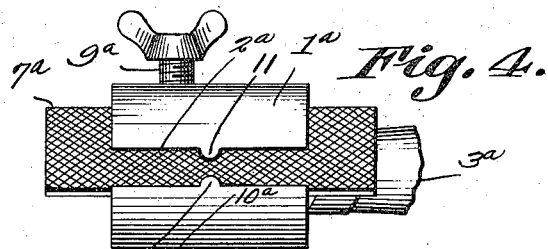
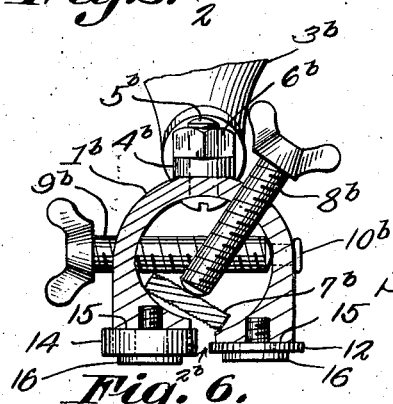
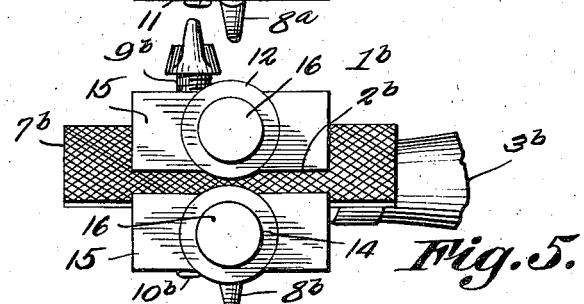
Samuel A. McKittrick INVENTOR.
BY [signature]
ATTORNEYS.

Patented Dec. 27, 1938

2,141,359

UNITED STATES PATENT OFFICE 2,141,359

LAWN MOWER SHARPENER

Samuel A. McKittrick, Sandusky, Ohio

Application October 18, 1937, Serial No. 169,690

4 Claims. (Cl. 76—82.1)

This invention has as one of its objects the provision of a device adapted to be used by hand for sharpening the blades of lawn mowers, either the fixed blade or the rotatable blades of the reel. The invention aims to provide a structure of the class described which can be operated simply and advantageously by hand, to provide novel means for regulating the size of the slot in the body which receives the part to be sharpened, to provide novel means for holding the sharpening member at adjusted angles, and to supply novel means whereby an operator can work conveniently, without assuming a position that would be inconvenient, considered relatively to the fact that the operator may be right-handed or left-handed.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawing:

Fig. 1 is a side elevation showing one form of the invention;

Fig. 2 is a top plan of the device depicted in Fig. 1;

Fig. 3 is a cross section on the line 3—3 of Fig. 1;

Fig. 4 is a bottom plan showing a modification;

Fig. 5 is a bottom plan showing another modification;

Fig. 6 is a cross section of the structure shown in Fig. 5.

Referring to Figs. 1, 2 and 3, there is provided a tubular body 1, having some resiliency, the body being supplied with a slot 2, extended the full length of the body. The numeral 3 marks a handle, extended lengthwise of the body and prolonged beyond one end of the body, the handle including an angular shank 4, secured to the body at a point midway between the ends of the body, and opposite the slot 2, by any suitable means, such as a bolt 5 and a nut 6, the handle making a convenient acute angle with respect to the axis of the body 1.

A sharpening member, such as a file 7, is located within the body 1 and has its longitudinal edges in contact with the inner surface of the body. The sharpening member 7 can be shifted circumferentially of the body 1 to make the proper bevel on the lawn mower blade, either the fixed blade or one of the rotatable blades (not shown), introduced through the slot 2. In order to retain the sharpening member 7 in any position to which it may have been adjusted, circumferentially of the body 1, a holding device is provided, and the same may be a wing screw 8, threaded into the body 1 and bearing at its inner end against the sharpening member 7.

In order to vary the width of the slot 2, and thereby to adapt it to the thickness of the blade, an expanding and contracting mechanism for the body 1 is provided, and may be a wing screw 9, threaded into one side of the body, one end 10 of the screw being mounted to rotate in the opposite end of the body and being held against longitudinal movement therein.

In practical operation, the lawn mower is set on a bench, with the handle of the mower extending down to the floor. The device is moved along the rotatable blades of the mower and the member 7 bevels and sharpens them. The fixed blade of the mower is sharpened in the same manner but since its bevel is opposite to the bevel of the rotatable blades, the transverse slant of the member 7 has to be reversed. This is done by loosening the nut 6, turning the body 1 end for end, and then tightening up the nut 6. The operator can do both jobs with the handle 3 projecting in the same direction, which is handier than reversing the entire device and working from the opposite end of the blades. A reversal of the entire device would force a right-handed operator to work left-handed part of the time, and a left-handed operator to work right-handed part of the time, something that would be neither convenient nor productive of the best results.

It is not necessary that the blade have contact with the edges of the slot throughout their entire length. In Fig. 4, parts hereinbefore described are designated by numerals already used, with the suffix "a". In Fig. 4, the body 1a has oppositely disposed fixed projections 11 located midway between the ends of the slot 2a and extended inwardly toward each other beyond the edges of the slot. In Figs. 5 and 6 the projections are rotatable disks 12 and 14 held on flat surfaces 15 of the body by headed screws 16. The disk 14 may be somewhat thicker than the disk 12, to make up for differences in thickness in different parts of the same blade. In Figs. 5 and 6, parts hereinbefore described have been designated by numerals already used, with the suffix "b".

Having thus described the invention, what is claimed is:

1. A sharpener of the class described comprising a tubular resilient body having a slot, means extended across the body for changing the width of the slot, a sharpening member within the body and resting at its edges against the body, the sharpening member extending across the slot and being slidably adjustable circumferentially of the body to vary the angle of said sharpening member, and means for holding the sharpening member in place.

2. A sharpener of the class described comprising a tubular resilient body having a slot, means extending across the body for changing the width of the slot, a sharpening member within the body and extended across the slot, and means separate from said first mentioned means for holding the sharpening member in place.

3. A sharpener of the class described, comprising a tubular body having a slot, a sharpening element within the body and resting on its edges against the body, the sharpening element having a sharpening surface extending across the slot and being slidably adjustable circumferentially of the body to vary the angle between said sharpening surface and the work to be sharpened, and a pressure member for holding the sharpening element in adjusted place, said body having a single place of mounting for said pressure member, the pressure member engaging the surface of the sharpening element opposite said sharpening surface, whereby the angle between the sharpening element and the work may be varied by indefinitely small amounts.

4. A sharpening tool of the class described, constructed as set forth in claim 3, in combination with a handle spaced from the sharpening element and extended beyond one end of the body, and means for securing the body to the handle for end-for-end reversal, whereby the slant of the sharpening element with respect to the work may be reversed, with the handle projecting in the same direction with respect to the work, and without reversing the entire tool end-for-end with respect to the work.

SAMUEL A. McKITTRICK.